Aug. 28, 1945.  C. B. GWYN, JR  2,383,545
SELF-LOCKING NUT
Filed July 9, 1943

INVENTOR
Childress B. Gwyn Jr
BY
Kenyon & Kenyon
ATTORNEYS

Patented Aug. 28, 1945

2,383,545

UNITED STATES PATENT OFFICE 2,383,545

SELF-LOCKING NUT

Childress B. Gwyn, Jr., Bannockburn, Ill., assignor, by mesne assignments, to Smaller War Plants Corporation, New York, N. Y., a corporation of the United States Application July 9, 1943, Serial No. 493,992

2 Claims. (Cl. 151—7)

This invention relates to self-locking nuts.

A self-locking nut now on the market comprises a casing in the form of a cup having a flat bottom provided with an aperture and having the side wall of polygonal contour to define a polygonal socket. A metal nut member and a preferably elastic locking member are positioned within the casing and have their peripheries so shaped as to fit the inside of the casing. Each wall portion terminates in a tapering integral tab, the base of which is co-extensive with the top edge of the corresponding wall portion and such tabs are inturned over the locking member to retain the locking member and the nut member in the socket.

In this nut, the locking member which usually is composed of fiber, is exposed over a considerable portion of its area to atmosphere, particularly before its assembly with a bolt. Not infrequently, the action of atmosphere on the fiber locking member so affects it that it has a tendency to loosen and rotate within the casing during assembly of the nut on a bolt. Also, after assembly with the bolt, part of the area of the locking member is still exposed to any mechanical and/or abrasive and/or humidity and/or corrosive conditions present and such conditions may considerably shorten the useful life of the nuts.

An object of this invention is a self-locking nut in which the fiber locking member is provided with a metal protector which in addition assists in firmly securing the fiber locking member against rotation in the shell.

Other objects, novel features and advantages of this invention will become apparent from the following specification and accompanying drawing, wherein.

Figure 1:
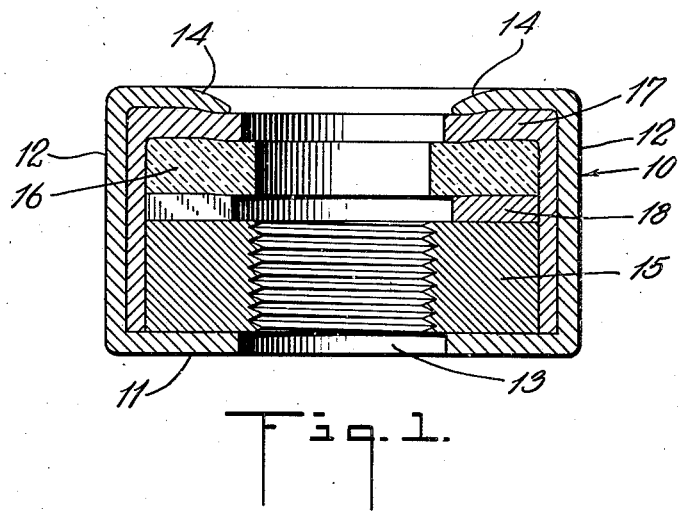
Fig. 1 is a section through one embodiment of the nut.

A nut embodying this invention comprises a sheet metal cup or casing 10 formed in such a manner as to have a flat bottom 11 and a series of flat wall portions 12 defining a polygonal socket with the flat portions 12 forming surfaces on which a wrench may obtain a grip. The bottom of the cup is provided with an aperture 13 and the upper edge is scalloped or otherwise provided with extending tapered portions or tabs 14 which are adapted to be inturned as later to be described.

After the formation of the casing, a nut member 15 is inserted therein in contact with the casing bottom and a locking member 16 is placed on the nut member. Preferably, the nut member and the locking member are of the same shape as the interior of the casing but of smaller area. The bore of the nut member 15 is threaded while the bore of the locking member 16 is smooth and of less diameter than the major diameter of the nut member thread. The locking member 16 may be of material known as vulcanized fiber, Bakelite, rubber or other elastic and relatively tough material of like nature.

A flat-bottom cup-shaped shell 17 is arranged within the casing 10 with its rim engaging the bottom of the casing and with its wall interposed between the exteriors of the nut member 15 and locking member 16 and the interior of the casing 12. The exterior wall of the shell 17 preferably is of the same polygonal contour as the casing 10 so as to be held against rotation therein and the interior wall is of suitable shape and size snugly to receive the nut and locking members 15 and 16 respectively. In the bottom of the shell 17 is a central aperture of slightly larger area than the bore of the locking member 16.

After location of the nut and locking members 14 and 15 and the shell 17 within the casing 10, the tabs 14 are inturned over the bottom of the shell 17 by any suitable mechanism. Preferably, sufficient pressure is applied to the tabs to cause the inner edges thereof to press in on and render concave the bottom of the shell 17. Such concavity exerts a spring pressure on the locking member 16 further binding it in place and also affords a protective facing. A resilient member 18 may be interposed between the nut member and locking member to assist in retaining a secure grip thereon.

Figure 2:
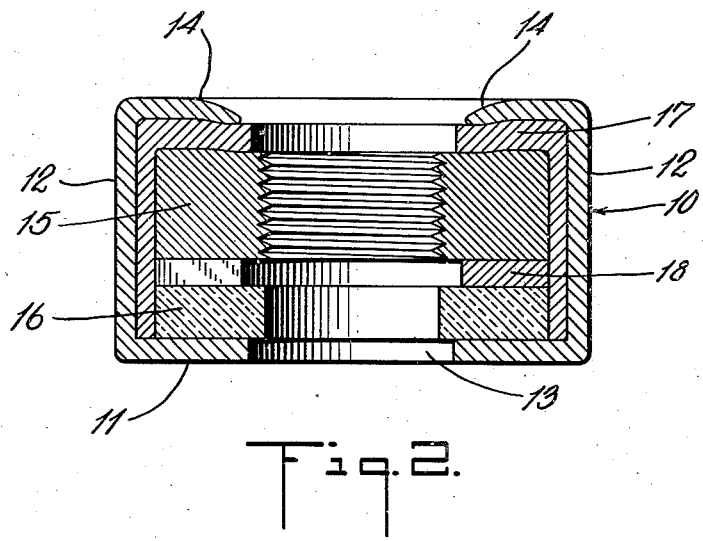
Fig. 2 is a section through a second embodiment of the nut.

In the modification illustrated in Fig. 2, the arrangement of the nut and locking members 15 and 16 is reversed. The locking member 16 is located in contact with the bottom 11 of the casing 12 while the nut member 15 is arranged to be engaged by the bottom of the shell 17. The tabs 14 are inturned against the bottom of the shell 17 and are forced inwardly sufficient to render concave the bottom of the shell as previously described.

While a resilient member 18 is shown in the drawing and described in the specification, it is to be understood that the invention contemplates the omission of this member. The nut of this invention may consist merely of the nut and locking members within the shell 17 in turn received within the casing 10 and the tabs bent over the bottom thereof. Also, it is to be understood that various modifications may be made in the structure above described without in any way departing from the spirit of the invention as defined in the appended claims.

I claim:

1. A self-locking nut comprising a flat bottom cup-shaped casing having a central aperture and being of polygonal interior and exterior contour, a flat bottom cup-shaped shell within said casing with its rim facing the casing bottom, said shell being of polygonal interior and exterior contour with its exterior contour being complemental to the interior contour of said casing to prevent rotation of said shell relative to said casing, a nut member and a locking member within said shell, said members being of external polygonal contour complemental to the interior of said shell to prevent rotation of said members relative to said shell, and extensions from said casing wall bent inwardly over said shell bottom to retain it, together with the nut and locking members, in said casing, an aperture in said shell bottom, a tapped aperture in said nut member and an aperture in said locking member, said locking member aperture being of less diameter than the major diameter of said tapped aperture and said shell aperture being only slightly larger than the locking member aperture whereby the face of the locking member is substantially covered by said shell bottom.

2. A self-locking nut according to claim 1 characterized by resilient means interposed between said nut and locking members.

CHILDRESS B. GWYN, Jr.